Patented June 22, 1937

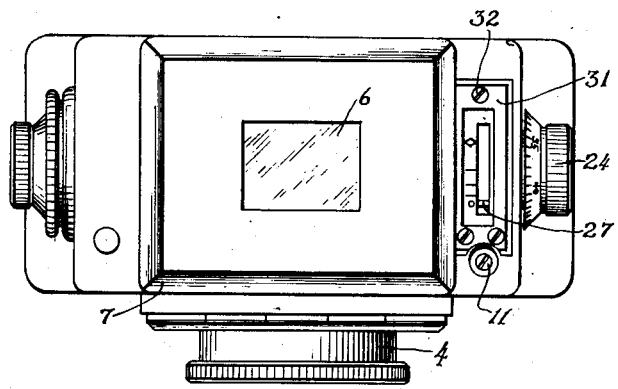
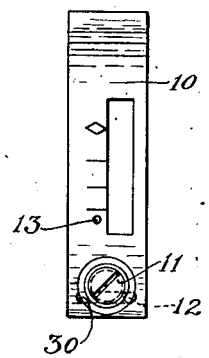
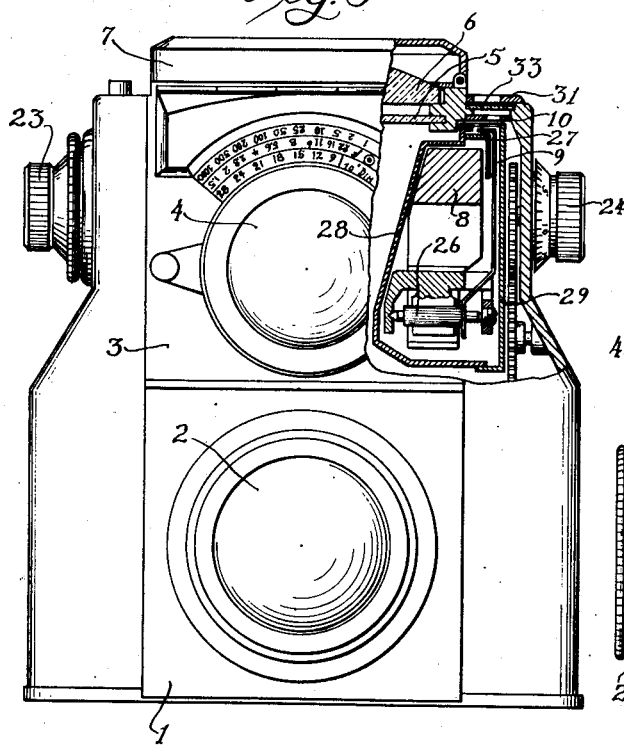
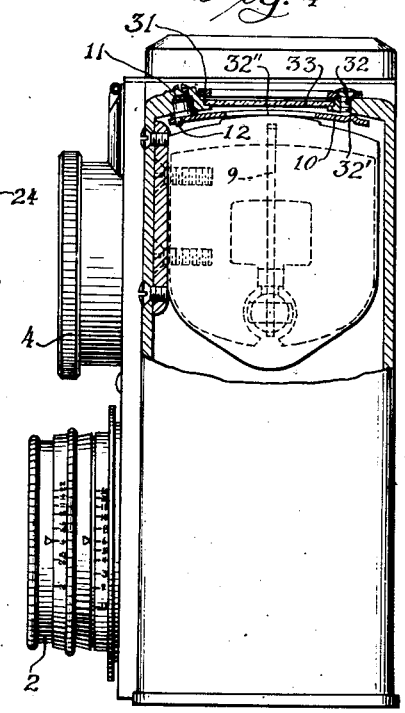

2,084,618

UNITED STATES PATENT OFFICE 2,084,618

PHOTOELECTRIC EXPOSURE METER

Heinz Küppenbender, Dresden-A, Germany, assignor to Zeiss Ikon Aktiengesellschaft, Dresden, Germany Application February 8, 1936, Serial No. 62,984
In Germany February 11, 1935

2 Claims. (Cl. 116—129)

This invention relates to improvements in photoelectric exposure meters, and is shown and described specifically with reference to an exposure meter of that type in which a pointer is movable over a calibrated dial in accordance with the intensity of light which energizes a photoelectric cell assembled of solid elements.

It is an object of the invention to provide an exposure meter with a dial which can be adjusted in respect of the path of movement of the pointer subsequent to the assembly of the entire instrument.

It is also an object of the invention to provide an exposure meter in which the adjustment of the dial relatively to the path of the pointer may be effected after the attachment of the exposure meter to another device, as for instance, a photographic camera of which the exposure meter is to form a permanent part.

Another object of the invention resides in the provision of means permitting a setting of the dial of the exposure meter without necessitating the opening of the housing of the meter, so that an accurate adjustment of the dial relatively to the pointer may be effected from the exterior of the housing.

Another object of the invention resides in the arrangement whereby any displacement of the dial from its original adjustment, as effected for instance, through climatic changes or during the shipment of the apparatus may readily be compensated for by readjustment of the dial without altering the relation of other parts of the instrument.

With these and numerous other objects in view, an embodiment of the invention is illustrated in the accompanying drawing and is described in the following specification.

In the drawing:

Fig. 1 is a top plan view of a camera equipped with an exposure meter having an adjustable dial.

Fig. 2 is a plan view of the dial with the adjusting means for the same.

Fig. 3 is a front elevation and partly section through a photographic camera united with the exposure meter, and Fig. 4 is a side elevation and partly section of the same camera with the exposure meter.

The camera illustrated by way of example in the present application is a camera of the reflex type although it is obvious that the invention can be applied to exposure meters detached from any camera or united with cameras of entirely different types. The reflex camera, as illustrated in the drawing, comprises a housing 1 provided with a camera lens 2 and with manipulating devices 23 and 24 for determining the various factors that are of decisive value for the exposure, as for instance, the adjustment of the diaphragm, of the shutter speed, and the movement of the film or other carrier of the sensitized emulsion to and from operative position with respect to the lens of the camera.

In cameras of the mirror reflex type, the housing associated with the lens usually is united with a second casing or compartment constituting the finder. The casing 3 for the finder in the embodiment illustrated is equipped with a lens 4 adapted to throw by means of a reflector, not illustrated, the image collected by the lens upon a screen 5 of frosted glass or the like, and in the embodiment illustrated, this image is viewed through a separate lens 6 disposed above the screen 5 of the finder. The lens 6 of the finder advisably is covered by a hood 7 which may be moved to a position to facilitate the inspection of the image on the screen 5 when swung to upright position.

The exposure meter associated with the camera in the present type and indicated as a whole at 8 comprises a solid photoelectric cell of the laminated type (not shown) adapted to be exposed to the light reflected from the object to be photographed. This assembly of layers which upon energization by the light is adapted to generate an electric current, is connected with an electric instrument of the D'Arsoval type. This instrument includes a magnet 8 between the poles of which a coil 26 is rotatably supported, the coil being connected with a pointer 9. This pointer, as illustrated in the embodiment of the present application, terminates in an angular portion 27 adapted to travel beneath a dial 10 which is provided with calibrations and which also has as part of its calibration a zero mark 13. The electric instrument 8 which may be inserted in the housing 3 of the finder is enclosed between cover elements 28 and 29, and as in other similar types of exposure meters, the operator determines for a selected diaphragm opening the required speed of the shutter by adjusting a resistance, not illustrated, and forming a part of the exposure meter, in such manner that the indicating end 27 of the pointer 9 is opposed to the zero mark 13 of the dial.

For the proper determination of the speed of the shutter or of other factors the value of which changes with different intensities of light, it is, therefore, advisable that the relation of the dial relatively to other parts of the instrument should be a relation which is to be fixed and which upon being altered should again be restored.

For the purpose of effecting this adjustment of the dial 10 which may become necessary under different conditions, the dial is formed as a curved plate having at one end a transverse slot 30 into which a pin 12 engages, said pin projecting eccentrically from the lower end of a setting screw 11 rotatably disposed in a portion of the casing for the exposure meter, and the head of which screw is accessible from the exterior of the casing to facilitate this adjustment. When the screw 11 is turned, the pin 12 is moved through an arc, and owing to the engagement of this pin in the transverse slot 30 of the dial plate, the latter will be shifted longitudinally of the scale or series of calibration marks thereon.

In this manner it is feasible to set the dial plate 10 at any time and to move thereby the zero mark 13 on said dial into a predetermined position with respect of the pointer 9 of the instrument. It is also obvious that this displacement of the dial for restoring the proper relation between the pointer 9 and the zero mark 13 on the dial may be effected in some other manner.

As shown in Fig. 1 the dial plate 10 is covered by a guard plate 31 which is held in fixed position on the top of the compartment 3 by screws 32 or the like. The position of this guard plate obviously is not affected in any way by the setting of the dial plate 10. As indicated in Fig. 4, the dial plate preferably is longitudinally curved about the axis of the pivotal movement of the pointer 9 and is provided with a raised point 32' adjacent one end to remain in contact with the interior face of the top wall of the compartment on which it is guided in some suitable way. Since the screw 11 remains by friction in the position to which it has been turned and the dial also is frictionally engaging the wall of the housing at 32", the dial will automatically be retained in adjusted position. A window 33 overlying the dial plate protects the latter against injury and against accidental displacement by the user.

It is obvious that the proper adjustment of the dial may be effected in the factory in which the instrument is being produced. If, then, owing to the shipment of the instrument to a locality having entirely different climatic conditions an alteration in the setting of the dial plate should occur, an operator can readily set the dial plate to bring the zero mark 13 thereon to the desired relation with respect to the pointer, and at any later time other adjustments of the dial plate may be carried out by the user whenever this should become necessary without necessitating the disassembly or even the opening of the instrument.

I claim:

1. An exposure meter, having a housing, a pointer movable in accordance with the intensity of the light acting on the exposure meter, a calibrated dial in respect of the calibrations of which said pointer is movable, a screw accessible from the exterior of the housing and having an eccentric pin projecting from an end face of the screw, the dial being provided with a transverse slot into which said pin projects, whereby upon rotation of said screw, a longitudinal displacement of the dial is effected.

2. An exposure meter having a housing, a pointer movable in accordance with the intensity of light acting on the exposure meter, a calibrated dial plate in respect of whose calibrations the pointer is movable, a screw accessible from the exterior of the housing and having an eccentric pin at one end, the dial being provided with a transverse slot through which said pin projects for effecting longitudinal displacement of the dial upon rotation of the screw, and the dial having a raised portion in engagement with the housing for retaining the dial in adjusted position when the force applied to the screw for rotating the same is released.

HEINZ KÜPPENBENDER.